April 27, 1954

C. E. DERRY

ANGLE COMPUTER 2,676,414

Filed Jan. 6, 1953

INVENTOR:
CARL E. DERRY
BY Lynn Latta
ATTORNEY.

April 27, 1954

C. E. DERRY 2,676,414

ANGLE COMPUTER

Filed Jan. 6, 1953

INVENTOR:
CARL E. DERRY

BY Lynn Latta

ATTORNEY.

April 27, 1954

C. E. DERRY 2,676,414

ANGLE COMPUTER

Filed Jan. 6, 1953

INVENTOR:
CARL E. DERRY

BY Lynn H Latta

ATTORNEY.

Patented Apr. 27, 1954

2,676,414

UNITED STATES PATENT OFFICE 2,676,414

ANGLE COMPUTER

Carl E. Derry, Inglewood, Calif.

Application January 6, 1953, Serial No. 329,785

13 Claims. (Cl. 33—174)

This invention relates to an angle computer for use by machinists and inspectors in designing and laying out models, castings, patterns and machined parts having surfaces of compound inclination with reference to plural layout planes. The invention has as its general object to provide a computer instrument which may be used for quickly determining the resultant inclination of such a surface as determined by given angles of inclination along the layout planes.

In general, the invention contemplates an instrument having a base for location against a plane base surface, from which all vertical distances are measured, a face plate to determine the angle of inclination of the surface of compound inclination with reference to perpendicular Y and Z ordinate planes, means connecting the face plate to the base for adjustment about tilt axes normal to said ordinate planes, and means for making inclination measurements in these two planes and setting the face plate for each of such measurements, whereby the resultant compound inclination is immediately determined.

Vice versa, the instrument of the invention makes it possible, when the resultant inclination is already established, as in a model of the apparatus, to immediately determine the component inclinations in the Y and Z ordinate planes.

A primary object of the invention is to provide such an instrument having a connecting mechanism such that the face plate is directly above the base and is firmly supported so that its accuracy of measurement will not be perceivably affected by sagging induced by excessive displacement of the weight load laterally from the vertical axis of support of the face plate by the base.

To this end, the invention contemplates an angle computer having a connecting core providing two tiltable connections the tilt axes of which are in crossed relation in the vicinity of the center of the instrument, whereby the movements of the face plate about the respective tilt axes is substantially a universal movement about a single common center.

A further object of the invention is to attain a high degree of accuracy in the measurements of inclination in the respective Y and Z ordinate planes. This is best accomplished by utilizing trunnion and bearing connections of relatively large diameter around the respective tilt axes. Accordingly, the invention contemplates a structural arrangement in which the base and face plate have respective bearing rings which are journalled upon a pair of rigidly associated rims of the connector member, the instrument having respective protractor indicia on said rims and rings respectively, for measuring angles in the Y and Z ordinate planes, down to a small fraction of a degree.

In order that the two axes of tilt may be located closely adjacent the center of the instrument, the respective trunnions of the connector and bearing rings of the base and face plate are arranged in intersecting relation. Such intersecting relation embodies the problem of providing for relative rotation between the respective bearing rings and the connector core. Another problem is that of avoiding inaccuracies resulting from springing apart of those pistons of these respective members, which are necessarily separated to provide gaps to receive the intersecting members. To meet these problms, the invention has a further object, to provide an angle computer having cooperating bearing rings and trunnions as above indicated; having openings or gaps in these respective members to receive the intersecting members, and yet having peripheral continuity of both the bearing rings and the trunnions, such as to prevent any appreciable circumferential distortion in any of these members.

In order to attain such peripheral continuity, the two axes of tilt are in non-intersecting relation, i. e., the respective trunnions are eccentrically displaced with relation to each other and each has a portion which pierces the other.

Another object is to provide, in such a computer, means for effecting fine vernier adjustments between the trunnions and the respective bearing rings. For this purpose, the invention incorporates worm gearing connections between these pairs of parts, with means for actuating the gearing to effect the vernier adjustments.

A still further object is to provide means for effecting rapid wide angle adjustment for establishing a rough setting preliminary to attainment of the vernier adjustment. To this end, the invention provides means for relatively shifting the gear element into and out of mesh, the out of mesh condition permitting a manual tilt of a respective bearing ring around its respective trunnion part, and the in mesh condition providing for the vernier adjustment and the locking of the parts in adjusted position.

Other objects will become apparent in the ensuing specifications and appended drawings in which:

Fig. 11 is a perspective exploded view of the instrument; and

Fig. 12 is a detail perspective exploded view of the shiftable pinion and its mounting.

General description

Referring now to the drawings in detail, my improved angle computer comprises generally (Fig. 11) a bearing ring A carried by a base B, a connector core CD, a bearing ring E, and a face plate F which is carried by the bearing ring E. Connector CD comprises a pair of trunnions one of which is indicated by the reference letter C and the other of which is indicated by the reference letter D. These trunnions are integral or rigidly connected in an intersecting relation such that their respective tilt axes X, X' are crossed at sight angles and non-intersecting, but closely adjacent the instrument center, which is indicated at O. As will be described in detail hereinafter, the axes of tilt, X and X', are disposed eccentrically above and below the instrument center O, whereby each trunnion has a portion of its periphery projecting beyond the adjacent portion of the periphery of the other trunnion. Such projecting trunnion portions are apertured to provide for piercing of each trunnion by the bearing ring of the other trunnion. The projecting portions of the trunnions include bridge parts arching over the respective apertures so as to provide peripheral continuity in each trunnion. This makes it possible to utilize geared adjustment connections between trunnions which tilt about axes located sufficiently close to a common center to achieve the load balance hereinbefore mentioned as a primary object of the invention.

Figure 7:
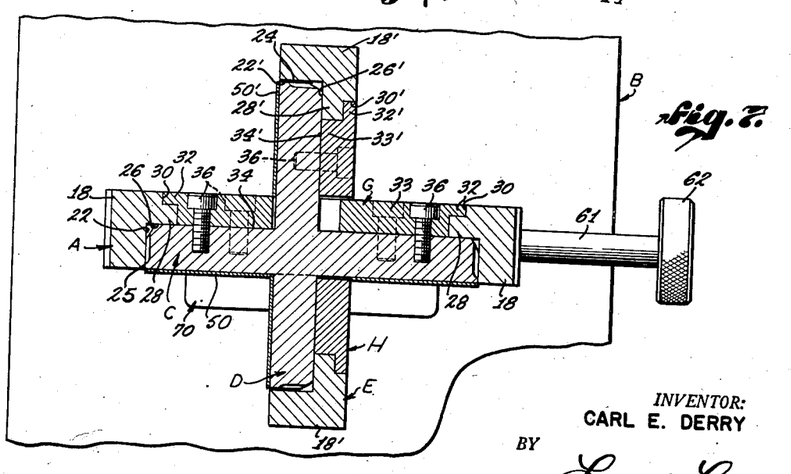
Fig. 7 is a horizontal sectional view taken on the line 7—7 of Fig. 6.

Trunnion C is journalled in bearing ring A for rotation about the axis X and trunnion D is journalled in bearing ring E for rotation around axis X' (Figs. 7 and 11). Rings A and E function not only as bearings, but also as friction clutch type locking rings, for locking the instrument tightly in any setting to which it has been adjusted. The parts are retained in assembled relation by caps G and H, secured to trunnions B and D respectively. The invention also provides means, which will be described later, for (a) indicating the angles to tilt between the trunnions and their respective bearing rings, with a vernier measurement of fractions of degrees; (b) gearing and actuator means for effecting and holding fine adjustments of such angles of tilt; and (c) means for de-meshing the gearing connections between the trunnions and their respective bearing rings, to enable the making of rough adjustments rapidly, by direct manual manipulation of the face plate. It will now be apparent that, with base B firmly supported against a base surface forming a reference plane, that face plate F may be adjusted, around axes X, X', to any compound angle of inclination with reference to two ordinate planes, at right angles to each other, said planes being indicated at Y and Z in Fig. 11. Thus, a part having a flat reference face secured against face plate F may be measured, located or machined with reference to the compound angle which has been determined by the setting of the face plate. For example, a casting which is to have a bevelled face subtending with the reference surface, a dihedral angle which is inclined with reference to both the Y and Z ordinate planes, may be simply clamped to the face plate F with one of its faces located against face plate F, and the bevelled face may then be machined in a plane parallel to the reference plane. Such machining can be accomplished by passing a milling cutter back and forth across the work while maintaining it in a plane parallel to that of base B, in accordance with well known milling machine practice.

Detailed description—parts A–H

In connection with the ensuing detailed description of the structure, reference may be made particularly to the exploded view Fig. 11, in which the various parts are shown as being separated along the two tilt axes X and X' but otherwise retaining the same relative positions along these respective axes as in the assembled instrument. Such reference to the exploded view, taken together with the assembly views, will facilitate an understanding of the relationships between the parts.

Figure 6:
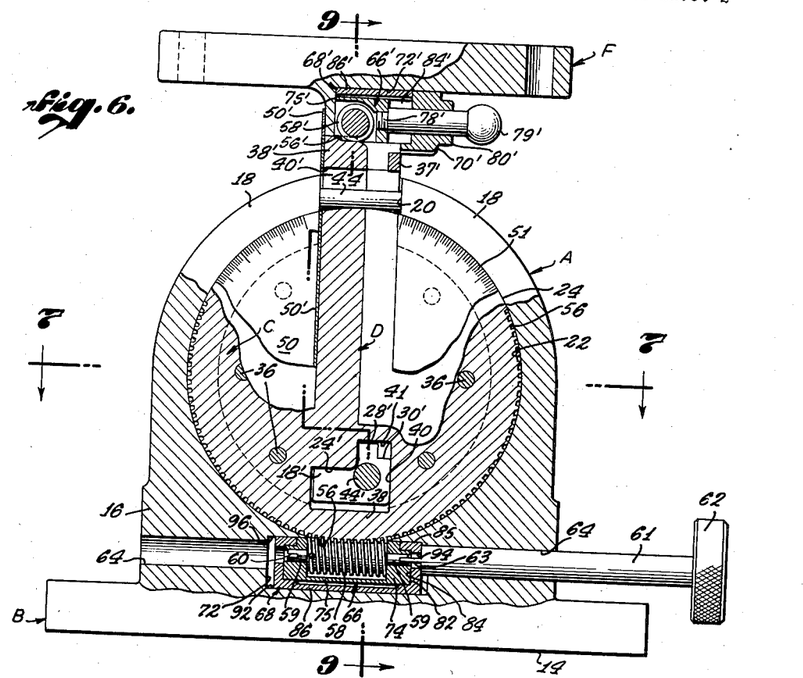
Fig. 6 is a vertical sectional view taken on the line 6—6 of Fig. 2.

Base B may comprise simply a flat slab of metal such as steel, with a flat under face 14 for location against a reference surface. Bearing ring A being functionally integral with base B may be either physically integral therewith, as indicated in Fig. 6, or rigidly secured thereto by any conventional means. Bearing ring A has a rectangular base portion 16 and an arched upper portion comprising a pair of quarter-circular arms 18 which are separated by a gap 20 at the top of the bearing ring. Gap 20 is centered on the median axial plane of ring A, which is the ordinate plane Y. Bearing ring A has a counterbore 22 providing a bearing surface which receives the peripheral surface 24 of trunnion C. Counterbore 22 has a bottom defined by a shoulder 26 constituting the inner side face of a flange 28 projecting radially inwardly. On the other side of flange 28 is a relatively shallow counterbore 30 which receives the peripheral flange 32 of cap G. Cap G has a body portion 33 which is disposed in the plane of flange 28 and encircled thereby; and has an inner face 34 which is secured against the inner face of trunnion part C. Cap screws 36 may conveniently be employed.

Trunnion C and cap G, when thus secured together, cooperatively define a peripheral groove which receives flange 28 of bearing ring A. A close tolerance fit is maintained between the peripheries of trunnion C and flange 32 and the counterbores 22 and 30 respectively, and between the bore of flange 28 and the periphery of body portion 33. These tolerances are sufficiently small to maintain concentricity between the bearing ring and the trunnion to a sufficient extent to eliminate any appreciable eccentric displacement between these parts. The fit between the lateral faces of flange 28 and the opposed faces of flange 32 and trunnion C is likewise close though not necessarily as snug as the peripheral fit. Thus sufficient freedom of rotative movement between trunnion C and bearing ring A is maintained so that, with a fine lubricant (e. g. watchmakers' oil) between the inter-faces, the trunnion may be freely revolved in the bearing ring.

Corresponding to the mounting of trunnion C and bearing ring A, trunnion D has a periphery 24′ mounted in a counterbore 22′ in bearing ring E, and cap H has a peripheral flange 32′ engaged in a counterbore 30′ in bearing ring E, and a body portion 33′ the periphery of which is fitted to the bore of a flange 28′ which separates counterbores 22′ and 30′ of bearing ring E. Body portion 33′ has an inner face 34′ which is secured against the cooperating face of trunnion D.

Bearing ring E, like bearing ring A, is a split ring comprising a rectangular base portion 16′ secured to face plate F, and laterally opposed arms 18′ the ends of which are separated to define a gap 20′ centered on the median axial plane of the ring, perpendicular to face plate F. In the zero (untilted) position of face plate F this plane coincides with ordinate plane Z, which constitutes the median plane of bearing ring A, parallel to the front and rear faces thereof.

The cap G is provided with a slot 35 opening through the periphery thereof at one side, extending along a diameter thereof, and terminating just short of the periphery at the opposite side thereof to provide a bridge 37 joining the two halves of the cap together. The slot 35 receives the trunnion D when the parts are assembled. Slot 35 has a widened portion 36 at its extremity adjacent bridge 37, to provide passage for arms 18′.

The cap H is provided with a diametral slot 35′ to receive trunnion C and bearing ring A in the assembled instrument. The width of slot 35′ is somewhat greater than the thickness of bearing ring A. Slot 35′ is open at one end and closed at the other end by a bridge 37′ which joins the two halves of the cap.

In the preferred form of the invention, the trunnions C and D are in the form of relatively thick, flat discs having cylindrical peripheries 24, 24′. In this form, production cost is reduced to a minimum since it is possible to fabricate the two trunnions as separate parts, by a conventional lathe operation, to slot each of them along a radius thereof, with a slot just wide enough to snugly receive the thickness of the other trunnion, to fit them together in the cruciform relation clearly shown in Fig. 11, and to then secure them together in any well known manner as by pinning, sweating, welding, etc. However, the core CD, once assembled, becomes in effect an integral unit and it will be understood that it could be fabricated from a single integral body of metal. It will also be apparent that, from a functional standpoint, it is relatively immaterial whether the side faces of the trunnions C, D are flat and parallel, or are faired into each other at the center of the core; nor is it essential that the peripheries 24, 24′ be cylindrical, so long as they are circular.

In the preferred form, furthermore, the opposed faces of each trunnion are symmetrical, or evenly spaced on respective sides of what will hereinafter be referred to as the planes of the respective trunnions. Such planes are the planes in which the tilt axes X, X′ lie. These planes intersect at the core center O, though as previously noted, axes X and X′ are spaced from said center. At this point it should be noted that while it is preferred to observe symmetry of the respective sides of each trunnion about the trunnion plane, it is not essential that the trunnion plane be located exactly midway between the sides of the respective trunnions; it would be possible to have the respective trunnions displaced in either direction along the respective tilt axis X, X′ in one direction or the other, so long as the core member CD maintains, essentially, the characteristic of being generally symmetrical about its center O, which, in any event, is located on the intersection of the two trunnion planes.

The combined displacement of the two tilt axes X and X′ on respective sides of the core center O is just sufficient so that each trunnion will have one side thereof projecting beyond the adjacent periphery of the other trunnion by an amount equal to the radial thickness of the main rim portion of a bearing ring, plus the thickness of a bridging portion 38 of the respective trunnion, arching over an opening 40 defined in the trunnion between said bridging portion 38 and the said adjacent periphery of the other trunnion. The opening 40 is of the proper dimensions and shape to freely pass the arcuate portion of the bearing ring which encircles the other trunnion. Opening 40 is L-shaped, including portion 41 projecting radially inwardly from the periphery of the other trunnion to receive the flange 28′ of the bearing ring E (see Fig. 6). The opening 40 of trunnion C is at the bottom of the core to receive the arcuate portions of arms 18′ of bearing ring E which lie below center, and the opening 40′ of trunnion D is disposed at the top of the core to receive the arcuate portions of arms 18 of bearing ring A, which are disposed above center.

*Assembly of parts*

The gaps 20, 20′ function to allow passage of parts during assembly and disassembly of the instrument. They have no function in the use of the assembled instrument.

In bringing the parts together in assembly from their positions shown in Fig. 11, core C is first inserted into bearing ring A and secured by fitting cap G over trunnion D and against trunnion C, and then securing it to trunnion C. Bearing ring E, with cap H assembled therein, is then placed in embracing relation to bearing ring A, centered on gap 20, and then inserted downwardly into gap 20. Cap H is then secured to trunnion D.

Figure 8:
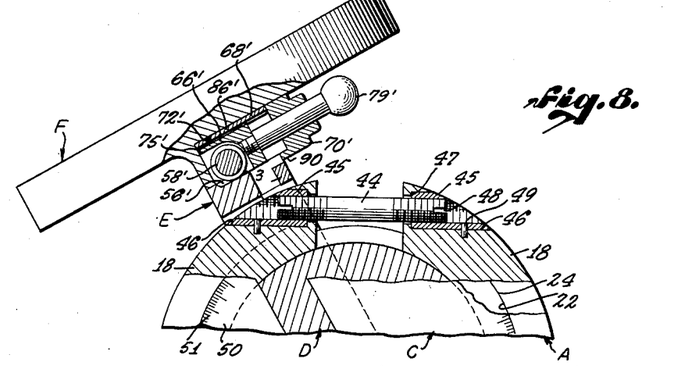
Fig. 8 is a sectional view taken in substantially the same plane as Fig. 6, but with the parts adjusted to a different angle.

In the assembled instrument, the gaps 20, 20′ are bridged by locking actuators 44, 44′ (Figs. 8 and 9) each having at its respective ends, right and left hand threads meshing with corresponding threads in cylindrical nuts 45, 45′ which are mounted in bores 46, 46′ in the respective bearing arms 18, 18′. The inner ends of bores 46, 46′ are reduced to provide shoulders 47, 47′ against which the ends of nuts 45, 45′ may abut. Nuts 45, 45′ are snugly fitted into their respective bores, with sufficient frictional engagement therein to resist rotation, but with sufficient tolerance to permit the nuts to be drawn together into their respective bores as the result of rotation of actuators 44, 44′ during the assembling operation.

Links 44, 44′ are provided with suitable wrenching means (e. g. screw driver slots 48, 48′) to provide for actuation. In using the instrument, the adjustment thereof to a selected setting is accomplished while the bearing rings A and E are loosened sufficiently to provide for easy rotation between them and the core CD. When the adjustment to the selected setting has been accurately completed, the actuators 44, 44' are rotated so as to tighten the respective bearing rings A and E in clamping engagement with trunnions C and D, thereby locking the setting.

In assembling an actuator 44, or 44', it is inserted through one of the bores and into the other; nuts 45, 45' are then inserted and are manipulated to starting positions at the beginning of the respective threads of the link, while the latter is rotated to thread the same into the nuts. The rotation is continued until the nuts are drawn against the shoulders 47, or 47'. The nuts are then secured, as by means of pins 49, 49'.

Tilt indicators and actuator units

Each trunnion and its cooperating bearing ring are provided with tilt indicator means comprising a protractor scale attached to the exposed face of a respective trunnion (scale 50 for trunnion C—scale 50' for trunnion D) and a vernier plate attached to the corresponding bearing ring (vernier plate 52 for bearing ring A, vernier plate 52' for bearing ring E.) Protractor scales 50, 50' have scale markings 51, 51' designating angular degrees, and vernier plates 52, 52' have vernier markings 53, 53' including a central mark or "zero" marks 54, 54' for designating the non-tilted positions of the respective trunnions when lined up with corresponding 90 degree markings on the protractor rings 50, 50'. The vernier marks 53, 53' indicate fractions of degrees in accordance with well known practice in vernier scales.

The protractor scales 50, 50', and vernier plates 52, 52' may be of thin sheet metal or plastic sheet, and may be mounted in any suitable manner, as by cementing them to their respective mounting faces.

For each trunnion there is provided actuator mechanism including gear teeth in the periphery of the respective trunnion (teeth 56 for trunnion C, teeth 56' for trunnion D) and a worm which is rotatably mounted in a respective bearing ring (worm 58 for bearing ring A, worm 58' for bearing ring E). Gear teeth extend from the respective bridges 38, 38', somewhat more than 90° in each direction therefrom. This makes it possible to rotate each trunnion a full 90° in both directions from its untilted position shown in Figs. 1–4, 6 and 12. The bridges 38, 38' continue these gear teeth across the openings 40, 40'.

Each worm 58 has, at its respective ends, trunnions (59 for worm 58, 59' for worm 58') which preferably constitute the projecting ends of a shaft extending through and suitably secured to the respective worm. Each trunnion has suitable wrenching means such as a socket or the screw driver slot 60, for receiving the driving tip of an actuator shaft 61 having a knurled knob 62 for engagement by the finger tips.

The rectangular base portions 16, 16' of the respective bearing rings are provided with aligned bearing bores 64, 64' for reception of actuator shaft 61 and for maintaining the shaft in coaxial relation with a respective worm 58 so that its driving tip 63 may engage in a screw driver slot 60 thereof. It will now be apparent that either worm can be actuated from either end thereof.

Worms 58, 58' are normally positioned in meshing relation with the teeth 56, 56' of the corresponding trunnions C, D, so that rotation of a worm will effect relatively slow rotation of the corresponding trunnion, thus tilting the bearing ring E and face plate F about either the axis X or the axis X', depending upon which trunnion is being rotated. This slow rotation of the trunnion provides for accurate vernier adjustment of tilt down to a fraction of a degree as read upon the vernier scale.

For making a rough preliminary adjustment of the face plate to approximately the desired angle, it would be time consuming and inefficient to utilize the worm gearing actuation. To speed up the use of the instrument, the invention provides for de-meshing either of the gearing connections, so that the corresponding trunnion may be freely rotated in response to manipulation of the face plate F. To this end, each actuator worm is mounted for shifting movement in a direction at right angles to its axis of rotation. Such mounting means is shown in exploded relation in Fig. 12. It includes a gear cradle, indicated generally at 66 (for worm 58, 66' for worm 58') a gear bracket (68 for cradle 66, 68' for cradle 66') in which cradle 66 is slidably mounted, and a gear bracket cap (70 for bracket 68, 70' for bracket 68') which, in the assembled instrument, is functionally integral with bracket 68 and is fabricated separately only for convenience in assembly. The bracket gear is mounted in a recess in the base portion 16 or 16' of a respective bearing ring A or E (recess 72 in bearing ring A, recess 72' in bearing ring E).

The ensuing detailed description of the mounting assembly for worm 58 will be understood as applying equally to the assembly for worm 58', and each of the numerals now referred to will have its counterpart in the same numeral, primed, for the other mounting assembly. The cradle 66 is generally of box shape, with end portions 74 connected by a web portion 75 of L-section, cooperatively defining a recess which is open at the front and the top of the cradle but closed at the ends, bottom and rear. In the end portions 74 are bores 76 in which are journalled the trunnions 59 of worm 58. The bores 76 extend all the way through the respective ends 74, to receive the driving tip 63 of actuator shaft 61. In the rear portion of web 75 is a centrally disposed threaded opening 77, into which is threaded the tip 78 of an actuator stem 79 for shifting the cradle 66. Actuator stem 79 is slidably mounted in a boss 80 forming part of cap 70.

The cradle end portions 74 are formed with parallel sided slides 82 which are snugly fitted in slideways 84 in bracket 68. Bracket 68 comprises end portions 85, in which the slideways 84 are milled, and a web 86 which joins the end portions 85. Projecting endwise from end portions 85 are ears 87 which are provided with apertures 88 registering with apertures 89 in cap 70. Cap 70 is essentially in the form of a flat bar, though it may have a lip 90 for locating against the upper edges of ears 87, thus to align the cap and bracket for assembly.

Figure 1:
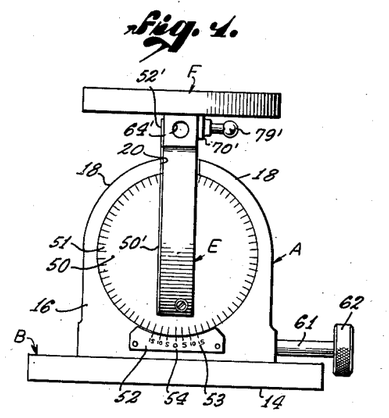
Fig. 1 is a front elevation of an angle computer embodying the invention.
Figure 2:
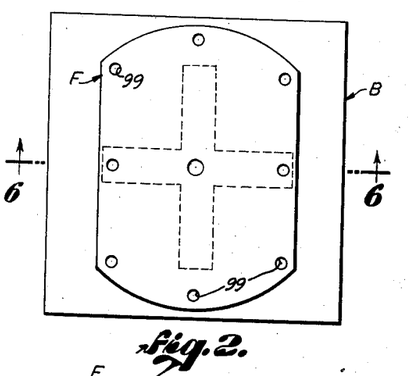
Fig. 2 is a plan view thereof.
Figure 3:
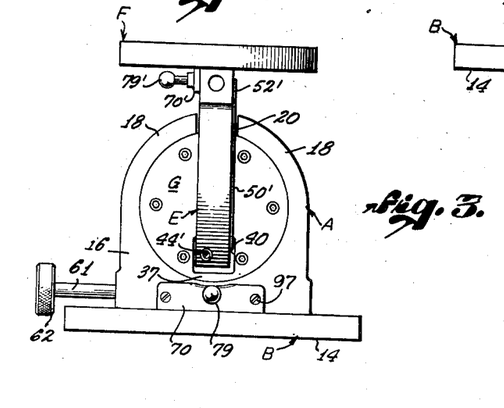
Fig. 3 is a rear elevation thereof.
Figure 4:
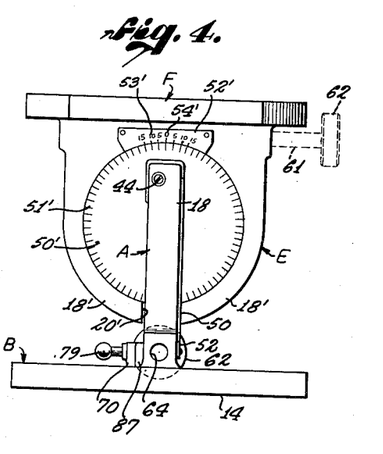
Fig. 4 is a right side elevation thereof.
Figure 5:
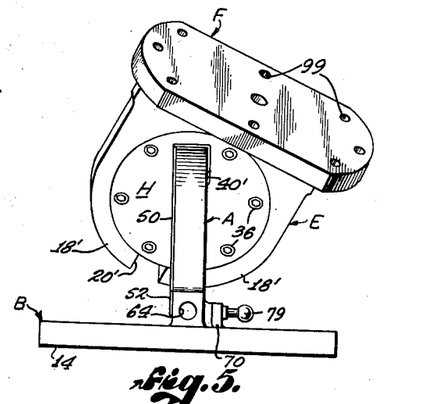
Fig. 5 is a perspective view showing the instrument adjusted to a compound angle of tilt.

In the assembled mounting, bracket 68, with the exception of ears 87, is received in recess 72 in the respective bearing ring, the under face of the bracket being flat and accurately machined so as to seat against a correspondingly machined seat face 92 constituting the bottom of recess 72, and the upper faces 93 of end portions 85 being correspondingly machined and seated against the upper wall 96 of recess 72. The bracket and cap are secured in assembly by suitable securing elements 97 extending through openings 88 and 89 and threaded or otherwise secured in base portion 16 of ring A (Fig. 3). End members 85 of bracket 68 are provided with openings 94 which are coaxial with bores 64, so that actuator tip 63 may pass therethrough.

Figure 9:
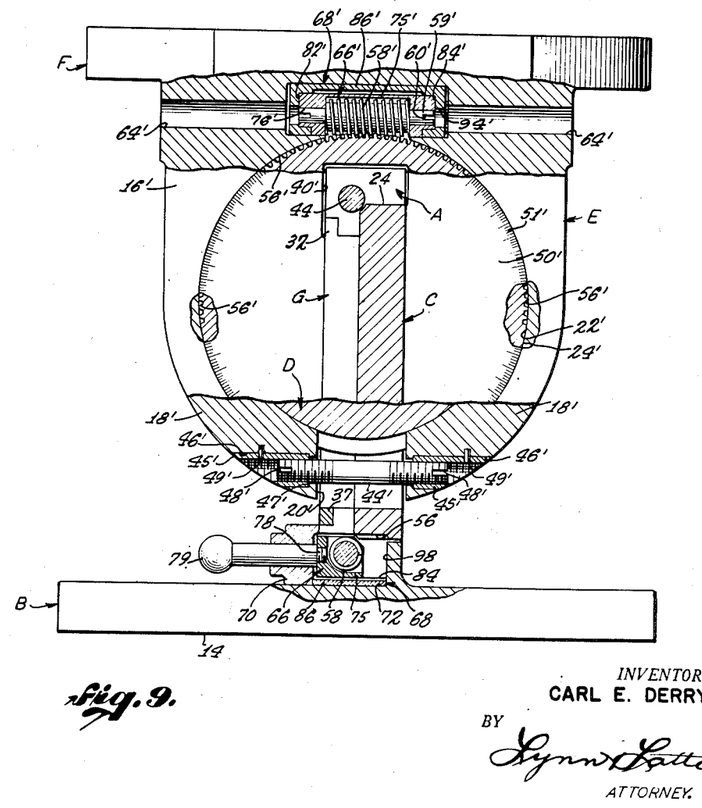
Fig. 9 is a vertical sectional view taken on the line 9—9 of Fig. 6.
Figures 10, 14, 15:
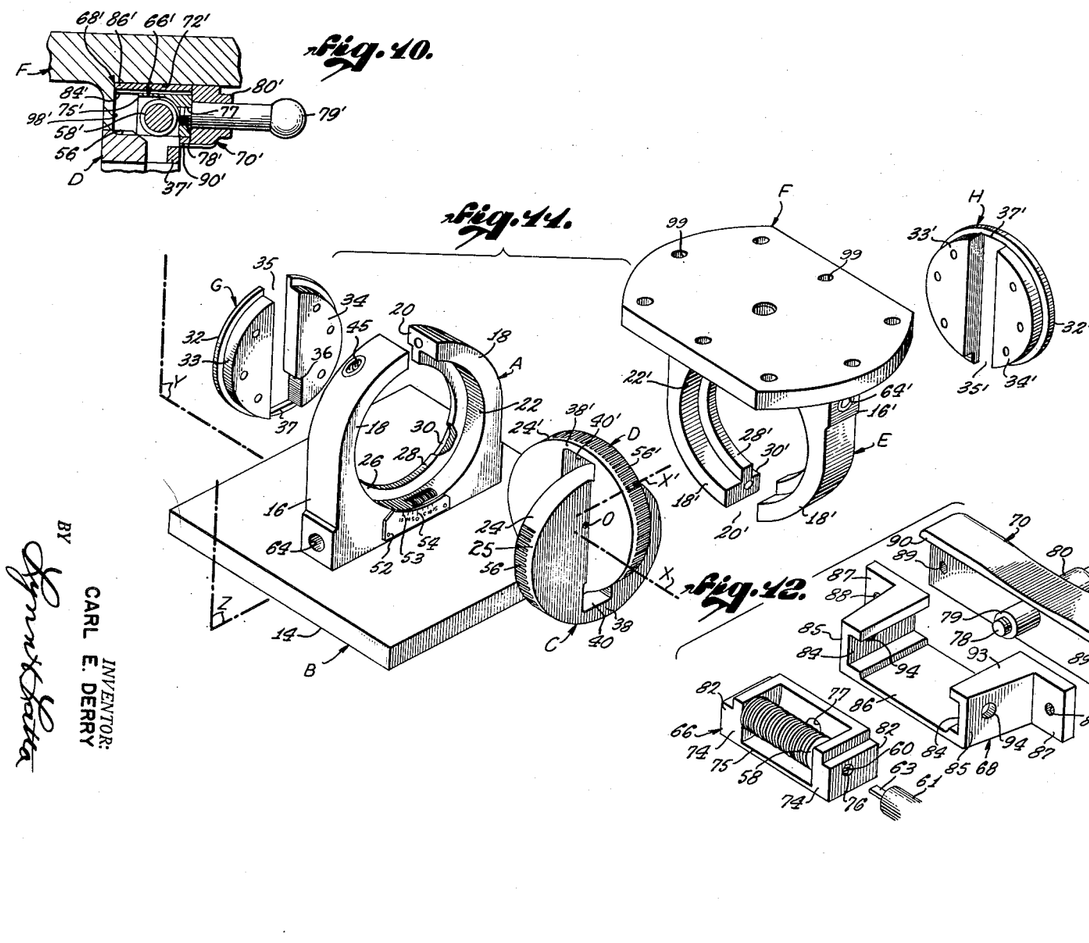
Fig. 10 is a detail sectional view illustrating disengagement of the face plate bearing ring from its cooperating trunnion.

Bracket 68 has a horizontal depth which exceeds the width of cradle 66 by an amount which determines the limits of shifting movement of cradle 66. The inner limit of such shifting movement is determined by the engagement of cradle 66 against the rear wall 98 of recess 72 (Fig. 9). In this position, worm 58 is in full mesh with gear teeth 56. The other limit of shifting movement is determined by engagement of cradle 66 against the inner vertical wall of cap 70. Between these positions, the slides 82 of cradle 66 slide in ways 84 while maintaining the axis of worm 58 constantly parallel to the axis of bearing bushing 64. In the in-mesh position of the worm 58, bearing bores 76 of cradle 66 are coaxial with bearing bushings 64, whereby the actuator shaft 61, when inserted through a bushing 64, will be aligned with the respective bore 76 so that its driving tip 63 may enter the same and engage in a screw driver slot 60.

Gear teeth 56 have their ends exposed in the side of trunnion C which faces bracket 68. Thus it is possible for the threads of worm 58 to enter the spaces between the gear teeth as the worm is shifted into mesh, and to leave said spaces as the worm is shifted out of mesh. The gear teeth do not however extend the full width of trunnion. They are terminated short of the back face of trunnion C, to provide a narrowed portion 25 of periphery 24, which is circumferentially coextensive with teeth 56, and provides for a continuous cylindrical bearing periphery in trunnion C, for maximum bearing support of the trunnion in its counterbore 22.

It will now be apparent that stem 79, with its tip 78 attached to cradle 66, provides a means for sliding the cradle 66 in bracket 68 so as to withdraw worm 58 out of mesh with gear teeth 56, leaving trunnion C free for rotation in response to manual manipulation of face plate F. Correspondingly, stem 79' of the other mounting unit provides a means for withdrawing worm 58' out of mesh with gear teeth 56' of trunnion D, allowing free tilting of face plate F about axis X' by manual manipulation. With both worms de-meshed, the face plate F may be freely tilted in any direction, about the center O of the instrument, to any desired position of compound inclination with reference to both axes X and X'. Having roughly determined the desired angle of tilt by manual manipulation, both worms may be shifted back to their meshed positions. The operator then proceeds to obtain a fine adjustment about each of the axes X and X' in turn, first inserting the actuator shaft 61 into one of the pair of bores 64 or 64' and manipulating one of the worms while reading the angle of tilt on the protractor scale and the vernier scale, and then inserting the actuator shaft 61 into one of the other pair of bearing bores 64' or 64 and manipulating the corresponding worm while reading the degree of tilt on the corresponding protractor and vernier scale.

As an example of a practical use of the apparatus, let us assume that a machinist is constructing a model from a series of blueprints showing a part with a corner bevelled off at a compound angle of inclination with respect to both a side and an end face of the part. It will also be assumed that such angles are indicated on the drawings in reference planes one extending longitudinally and the other transversely of the part. Using suitable clamps or hold-down screw hooks extended through openings 99 in face plate F, the workman clamps the part of face plate F with the flat face of the part in contact with the flat supporting face of face plate F and with the longitudinal axis of the part parallel with the longitudinal axis of face plate F. The workman then adjusts the face plate F roughly to the two angles of inclination as read on the respective protractor scales 50, 50', in the proper direction to elevate above the remainder of the part, the corner that is to be machined off. Using the vernier scales and the actuator gearing and shaft 61, he then adjusts the face plate to the exact angles of inclination in the respective reference planes Y and Z. The part will then be positioned so that an imaginary plane, parallel to base B, will pass through the corner in the exact location of the bevelled face that is to be produced at this corner. By a simple operation of placing the instrument on a milling machine bed and fastening it down and subsequently passing a milling or routing cutter across the projecting corner, the latter may be bevelled off to produce a surface parallel to the reference surface and therefore having the required compound inclination.

I claim:

1. In an angle computing instrument: a base for engagement with a reference surface; a face plate for determining the position of a plane making a selected dihedral angle with said surface; a pair of bearing rings, one secured to the base and the other to the face plate; a connector core comprising a pair of rigidly-connected trunnions having their respective axes in 90° crossed relation adjacent the general center of the instrument, having respective peripheral bearing faces journalled in the respective rings, and having their respective median planes in 90° intersecting relation at said center; means for indicating the angle of tilt of each trunnion relative to its respective bearing ring; and means acting between the trunnions and their respective bearing rings for adjusting said angles of tilt.

2. In an angle computing instrument: a base for engagement with a reference surface; a face plate for determining the position of a plane making a selected dihedral angle with said surface; a pair of bearing rings, one secured to the base and the other to the face plate; a connector core comprising a pair of rigidly-connected trunnions having their respective axes in 90° crossed relation adjacent the general center of the instrument; said trunnions comprising circular discs intersecting each other at right angles and each having its median plane, midway between and parallel to its respective sides, intersecting said center; each of said trunnions having its periphery journalled in a respective bearing ring, means for indicating the angle of tilt of each trunnion relative to its respective bearing ring; and means acting between the trunnions and their respective bearing rings for adjusting said angles of tilt.

3. An instrument as defined in claim 2, wherein each of said trunnions has a side face lying in substantially a common plane with a corresponding side face of its respective bearing ring; said means for indicating the angle of tilt hung carried respectively by said side faces of the trunnion and bearing ring of each pair.

4. In an angle computing instrument: a base for engagement with a reference surface; a face plate for determining the position of a plane making a selected dihedral angle with reference to said surface; a pair of bearing rings, one secured to the base and the other to the face plate, each bearing ring having therein a counterbore; a connector core comprising a pair of rigidly connected trunnions of disc form each having its periphery journalled within the counterbore of a respective bearing ring; said trunnions being arranged with their respective planes, substantially midway between their sides and parallel thereto, disposed in intersecting relation at the general center of the instrument; each trunnion having, adjacent its periphery, a flat annular side face lying in substantially a common plane with a side face of the respective bearing ring; a protractor scale on to one of said side faces of each pair; a cooperating indicator on the other side face of the pair and cooperative with such scale to indicate the angle of tilt of a respective trunnion relative to its respective bearing ring; and geared actuator means acting between the trunnions and their respective bearing rings for adjusting said angles of tilt.

5. In an angle computing instrument: a base for attachment to a reference surface; a face plate for determining the position of a plane making a selected dihedral angle with said surface; a pair of bearing rings, one secured to the base and the other to the face plate; a connector core comprising a pair of rigidly connected trunnions of flat disc form each having a median plane midway between and parallel to its respective sides, said median planes being in 90° intersecting relation at the center of the instrument, each of said trunnions having a cylindrical periphery journalled within a respective bearing ring, for relative tilting movement between the respective trunnions and their respective bearing rings, the tilt axes of said trunnions being in 90° crossed relation on opposite sides of said center and spaced therefrom though adjacent thereto within a distance only a fraction of the radius of the trunnions, whereby each trunnion is eccentrically disposed with reference to the axis of the other and has one side portion thereof projecting beyond the adjacent periphery of the other trunnion, said projecting side portions of the respective trunnions each having an aperture receiving the respective bearing ring of the other trunnion; means for indicating the angle of tilt of each trunnion relative to its respective bearing ring; and means acting between the trunnions and their respective bearing rings for adjusting said angles of tilt.

6. An angle computing instrument as defined in claim 5, wherein each bearing ring has a radially extending peripheral gap to receive the other bearing ring and its respective trunnion during assembly, and includes a detachable connector link bridging said gap and connecting the adjacent end portions of the bearing ring across said gap.

7. An angle computing instrument comprising: a base for engagement with a reference surface; a face plate for determining the position of a plane making a selected dihedral angle with said surface; a pair of bearing rings, one secured to the base and the other to the face plate, each of said bearing rings having a counterbore; a connector core comprising a pair of rigidly connected disc-like trunnions each having a periphery journalled in the counterbore of the respective bearing ring for relative tilting movements between the core and the respective bearing rings, said trunnions having gear teeth in said peripheries and having their respective tilt axes in 90° crossed but non-intersecting relation, disposed on opposite sides of said center, whereby each of said trunnions has a side portion projecting beyond the adjacent periphery of the other trunnion, said projecting portions each having an opening receiving the bearing ring of the other trunnion and including a toothed part bridging over said opening; a worm gear journalled in each of said bearing rings for meshing engagement with the gear teeth of a respective trunnion, for adjusting the angle of tilt between the respective bearing ring and trunnion; and means for indicating the angle of tilt of each trunnion relative to its respective bearing ring.

8. An angle computing instrument as defined in claim 7, including means mounting the respective worms for shifting movement, parallel to the tilt axes of their respective trunnions, between positions meshed with their respective gear teeth and de-meshed positions permitting free relative rotation between the respective trunnions and bearing rings.

9. In an angle computing instrument: a base for engagement with a reference surface; a face plate for determining the position of a plane making a selected dihedral angle with said surface; a pair of bearing rings each including an arcuate portion and a base portion of generally rectangular external contour, the base portions of the respective rings being respectively secured to said base and to said face plate, each of said bearing rings having therein a circular counterbore; a connector core comprising a pair of disc-like trunnions each having a circular periphery journalled within the counterbore of a respective bearing ring and having a plane annular side face adjacent said periphery, lying in a substantially common plane with a side face of a respective bearing ring; two sets of indicator elements each including a protractor scale on one of said faces and a coacting vernier scale on the adjacent face, for indicating the angle of tilt between each trunnion and its respective bearing; each of said trunnion peripheries having gear teeth therein; each of said bearing rings having in its base portion a recess communicating with the respective counterbore; a worm cradle slidably mounted in said recess; a worm journalled in said cradle and projecting through said recess into the respective counterbore, said cradle being shiftable, in a path parallel to the tilt axis of the respective trunnion, between positions in which said worm meshes with the respective trunnion gear teeth for transmitting tilting adjustment to the respective trunnion; and a position out of mesh therewith, for allowing free rotation of the respective trunnion in its counterbore; each of said bearing rings having in its base portion a bore which is coaxial with a respective worm when the latter is in its meshing position, said bore being adapted to receive an actuator shaft for rotating the respective worm.

10. An angle computer as defined in claim 9, including a mounting bracket secured in the base recess of each of said bearing rings, said mounting bracket having parallel ways and the respective worm cradle having at its respective end, slides which are slidably mounted in said ways, for carrying the respective worm between its said meshed and demeshed positions, said computer further including a stem having its inner end secured to said cradle, and bearing means on the respective bearing ring, in which said stem is slidably mounted for transmitting shifting movements to said cradle.

11. In an angle computing instrument: a base for attachment to a reference surface; a face plate for determining a position of a plane making a selected dihedral angle with said surface; a pair of bearing rings, one secured to the base and the other to the face plate, each of said bearing rings having a pair of axially spaced counterbores and an inwardly projecting flange separating said counterbores; a connector core comprising a pair of rigidly connected disc-like trunnions each having a circular periphery journalled in one of the counterbores of a respective bearing ring for relative tilting movements between the trunnions and their respective bearing rings, said trunnions each having a median plane midway between its respective sides, the respective median planes being in 90° intersecting relation at the general center of the instrument; said trunnions having their tilt axes arranged in 90° crossed, non-intersecting relation, spaced from said center on respective sides thereof whereby each of the trunnions has one side portion projecting beyond the adjacent periphery of the other, said projecting side portion being provided with an opening receiving the bearing ring of the other trunnion and having a bridge portion arching over said opening, the respective trunnions having in said periphery, gear teeth formed in said bridge portion and extending approximately 90° on each side of the center thereof; a pair of caps each having a peripheral flange journalled in the other of a respective pair of counterbores and a reduced diameter body portion extending through the opening defined by the flange of a respective ring and secured to the inner face of a respective trunnion, each of said caps having a diametric slot receiving the other trunnion; each of said bearing rings having a recess opening into its trunnion receiving counterbore; a pair of actuator worms each journalled in a respective bearing recess and projecting out of the respective recess into meshing engagement with the peripheral teeth of the respective trunnion, for transmitting rotational movement thereto; and means for indicating the angle of tilt of each trunnion relative to its respective bearing ring.

12. An angle computing instrument as defined in claim 11, including bracket means providing sideways in opposite ends of each of said recesses parallel to the tilt axis of the respective trunnion; a worm cradle having at its respective ends, slides slidably mounted in said slideways for carrying the worm between a position meshing with the respective trunnion and a position out of mesh therewith; and an actuator stem slidably mounted in the respective bearing ring and having its inner end attached to a respective worm cradle for sliding the cradle between said respective positions.

13. A computer as defined in claim 12, wherein said cradle has bearing bores and the corresponding worm has end trunnions journalled in said bearing bores, each bracket having in at least one of its slideways an aperture registering with one of said bearing bores when the cradle is in the position of meshing interengagement between its carried worm and the respective trunnion teeth; said instrument further including an actuator shaft having a driving tip for insertion through said aperture for driving engagement with the respective worm when the latter is in meshing position, and the respective bearing ring having a rectangular base portion provided with a bore coaxial with the aperture of the respective slideway, said last mentioned bore receiving and positioning the actuator shaft for cooperation with the worm.

References Cited in the file of this patent

UNITED STATES PATENTS

| Number | Name | Date |
|---|---|---|
| 1,889,248 | Kilner | Nov. 29, 1932 |
| 2,500,048 | Stoiber | Mar. 7, 1950 |